United States Patent [19]

Wooler

[11] 4,435,526
[45] Mar. 6, 1984

[54] PROCESS FOR THE MANUFACTURE OF UREA-FORMALDEHYDE/POLYURETHANE POLYMERS

[75] Inventor: Alan M. Wooler, Old Trafford, England

[73] Assignee: Abelard Management Services Limited, Manchester, England

[21] Appl. No.: 427,815

[22] Filed: Sep. 29, 1982

[30] Foreign Application Priority Data

Nov. 6, 1981 [GB] United Kingdom ............... 8133940
Sep. 13, 1982 [GB] United Kingdom ............... 8226000

[51] Int. Cl.³ ..................... C08G 18/14; C08G 18/18; C08G 18/54
[52] U.S. Cl. .................................... 521/107; 521/129; 521/136; 521/137; 524/779; 528/57
[58] Field of Search ............... 521/136, 107, 137, 158, 521/129; 524/779; 528/57

[56] References Cited

U.S. PATENT DOCUMENTS

| 3,632,531 | 1/1972 | Rush et al. ............................ 521/164 |
| 4,002,584 | 1/1977 | Takahashi et al. ............ 260/18 TN |
| 4,176,217 | 11/1979 | Goeser et al. ........................ 521/106 |
| 4,334,971 | 6/1982 | Mahnke et al. ................ 204/159.21 |
| 4,376,294 | 1/1983 | Hahn et al. ......................... 521/158 |

FOREIGN PATENT DOCUMENTS 1543475 4/1975 United Kingdom .
2001085A 7/1978 United Kingdom .
1541776 3/1979 United Kingdom .

Primary Examiner—H. S. Cockeram
Attorney, Agent, or Firm—Cushman, Darby & Cushman

[57] ABSTRACT

Novel polymers of excellent heat- and flame-resistance are obtained by reacting together an aqueous solution of an aminoplast precondensate such as a urea-formaldehyde syrup, an organic polyisocyanate comprising di(isocyanatophenyl)methane or a mixture of di(isocyanatophenyl)methane with poly(isocyanatophenyl)polymethylenes, and an isocyanate-reactive organic polyol in the presence of a tertiary amine as catalyst and a poly(haloalkyl)phosphate, especially tris-(2-chloroethyl)phosphate.

Under normal circumstances, foamed materials are obtained, but non-foamed materials can be obtained by carrying out the reaction in the presence of a $CO_2$ absorbent.

6 Claims, No Drawings

PROCESS FOR THE MANUFACTURE OF UREA-FORMALDEHYDE/POLYURETHANE POLYMERS

This invention relates to a new process for the manufacture of flame-resistant polymer materials. More particularly, the invention is concerned with the manufacture of flame-resistant polymer materials by the reaction together of organic polyisocyanates, polyfunctional isocyanate-reactive compounds and aqueous solutions of aminoplast precondensates in the presence of catalysts for the polyurethane-forming reaction.

It is known from U.S. Pat. No. 3,632,531 that foamed resins which are fire retardant and heat resistant can be obtained by reacting an aromatic polyisocyanate and a methylol resin which has a water content of less than 10% by weight in the presence of a catalyst of the type used in polyurethane foam formation. This process suffers from the disadvantage that liquid methylol resins of the aminoplast series commercially available on the market all contain much more than 10% by weight of water and must be dehydrated before they could be used. The present invention overcomes this difficulty by enabling the use of aminoplast resins containing much higher proportions of water, thus aminoplast resins which are commercially available can be used directly in the new process.

Also, UK Specifications Nos. 1541776, 1543475 and 2001085 describe a series of processes for reacting aqueous aminoplasts with organic polyisocyanates, and optionally polyols, to obtain foams with fire-resistant properties; these processes require the use of an acid catalyst, in two of the specifications jointly with an amine catalyst. The products of these processes suffer from problems associated with the presence of acidic residues arising from the acid catalyst. The present invention overcomes this by avoiding the use of an acid catalyst.

According to the present invention, there is provided a process for the manufacture of flame-resistant polymer materials by reacting together an aqueous solution of an aminoplast precondensate, an organic polyisocyanate comprising di(isocyanatophenyl) methane or a mixture thereof with poly(isocyanatophenyl)-polymethylenes, and an isocyanate-reactive organic polyol together with a tertiary amine as catalyst, characterised in that the reaction is carried out in the presence of a poly(haloalkyl)phosphate.

As used herein, the term "aminoplast precondensate" is intended to mean a water-soluble N-methylol composition which is prepared by reacting, under neutral or weakly alkaline conditions, formaldehyde with an aminoplast-former which contains amino, imino or amide groups. Known aminoplast-formers include, e.g., urea, thiourea, guanidine, melamine, amine-modified phenol-formaldehyde condensates, diaminotriazines, aminodiazines e.g. aminopyrimidines and aminoquinazolines, cyanamide, dicyandiamide and aromatic diamines e.g. phenylene diamines.

Whilst the invention includes the use of di(isocyanto phenyl)methane itself, it is preferred to use the mixtures of this compound with poly(isocyanatophenyl)-polymethylenes which are commercially available as "polymeric MDI's" or "crude MDI's" and which are prepared by condensation of aniline with formaldehyde and phosgenation of the resultant mixture.

As examples of organic polyols which may be used, there may be mentioned those having 2 to 8 hydroxyl groups, preferably having a molecular weight of from 100 to 2000, more preferably 200 to 1000, e.g., polyesters, polythioethers, polyacetals, polycarbonates, polyesteramides and more especially, polyethers, having at least 2 and preferably from 4 to 6 hydroxyl groups. Mixtures of such polyols can be used, especially those which are known to be used for the production of cellular or non-cellular rigid polyurethanes.

As examples of poly(haloalyl)phosphates which can be used, there may be mentioned tris-(2-chloropropyl)-phosphate, tris-(2,3-dichloropropyl)phosphate, tetrakis-(2-chloroethyl)ethylenediphosphate, tetrakis-(2-chloroethyl)-2,2-bis-(chloromethyl)propylenediphosphate and, preferably, tris-(2-chloroethyl)phosphate.

As examples of tertiary amines which can be used, there may be mentioned trialkylamines, more especially those containing $C_2$ to $C_6$ alkyl groups, dialkylaralkylamines, N-alkylmorpholines, dialkylaminocycloalkanes, di-N-morpholinodialkyl ethers, bis-dialkylaminodialkylethers and tetraalkylalkylenediamines, e.g., triethylamine, dimethylaminocyclohexane, dimethyloctadecylamine, N-methyl- or N-ethyl-morpholine, di-N-morpholinodiethyl ether, bis-(dimethylamino)diethyl ether, tetramethylethylenediamine and tri-(dimethylamino)phenol. In some cases, it is possible to use an isocyanate-reactive polyol containing tertiary amine groups to act both as reactant and catalyst, e.g., poly-(oxypropyl) and poly-(oxyethyl) derivatives of ammonia or primary amines or, more especially, of diamines e.g. ethylene or toluylene diamine.

In carrying out the new process, there is used a stoichiometric excess of the polyisocyanate over the amount of polyol used. The polyol can be added to the aqueous aminoplast precondensate, and this mixture reacted with the polyisocyanate, but as a general rule, it is found preferable to form a "prepolymer" by first reacting the whole or part of the polyol with the polyisocyanate and to subsequently react this prepolymer with the aqueous aminoplast precondensate, together, where appropriate, with the remainder of the polyol. In all cases, it is preferred to mix the poly-(haloalkyl)phosphate with the polyisocyanate before reacting the latter with any of the other reactants, since by this means, a homogeneous mixture is more readily obtained. Reaction of the polyol and the polyisocyanate to form a prepolymer can be effected in the usual manner, e.g., by leaving the mixture to react at ambient temperatures, which might take, e.g., 2 to 3 days; or by heating the mixture to effect reaction in a shorter time, e.g., at 80° C. for 2 hours. It is desirable that the proportions of polyol, poly-(haloalkyl)phosphate and polyisocyanate give a blend of viscosity suitable for easy mixing using conventional mixing pumps; this will normally be achieved by having an isocyanate content of from 14 to 28% by weight, preferably from 19 to 23% by weight, and a viscosity below 500 poise at 25° C. Normally, the amount of poly(haloalkyl)phosphate used will lie between 10% and 100% by weight of the combined weight of polyol and polyisocyanate used.

A further preference is to mix the amine catalyst with the aminoplast precondensate solution together with a small amount of a surfactant which helps to stabilise for foam and/or to aid dispersion of the amine catalyst when this is insoluble in or has low solubility in water. In choosing the tertiary amine to be used as catalyst, it is useful to note that the shelf life of aminoplast precondensates is usually limited, and that the addition of some tertiary amines can promote the onset of thickening and subsequent gelation. For example, dimethylaminoethanol and tris-(dimethylamino)phenol cause accelerated thickening of urea-formaldehyde precursor syrups whilst di-N-morpholinodiethyl ether and dimethylbenzylamine have little effect. Dimethylaminocyclohexane is particularly useful in this connection.

When part of the polyol is used to prepare a prepolymer and the remainder is added to the aminoplast precondensate, it is sometimes advantageous to use different polyols in the two stages. For example, there can be used a poly-(oxypropyl)polyether for making the prepolymer and a poly-(oxyethyl/oxypropyl)polyether in the aqueous phase, thus taking advantage of the superior solubility of the latter type of compound in water.

A number of optional additives can be used in the new process. For example, a small quantity of fluorocarbon blowing agent can be added to the polyisocyanate or its mixture with a polyol without seriously affecting the foam stability. The foams resulting from such mixtures have low density and an open-cell structure, from which it appears that the blowing agent vapourises and escapes during the course of the reaction and does not contribute to the thermal insulation of the final product. The main advantage of such an addition, therefore, lies in providing a polyisocyanate component of reduced viscosity, resulting in a greater mobility of the foaming mixture, which then displays better flow properties, making it particularly useful in some types of in situ foaming applications.

Other optional additives which would normally be added to the polyisocyanate include, e.g., halogenated organic compounds known from the literature on the subject or used in practice for improving the fire-resistance of foam materials, e.g., chlorinated paraffin wax and esters of halogenated acids, and plasticisers, e.g., diisooctyl phthalate or diaryl phosphates.

In addition to the reactants and additives described above, there may also be added to the aminoplast precondensate solution certain alkaline materials which are able to absorb the $CO_2$ produced by the reaction of the isocyanate groups and water. In the absence of such alkaline materials, the products of the invention are foams, rigid foams when made from the preferred starting materials, in which the densities can be varied to some extent by choice of the ratio of aminoplast precondensate to polyisocyanate or prepolymer. In general, the ratio of polyisocyanate to aminoplast can be varied within the limits of 50 to 500 parts by weight of the polyisocyanate for each 100 parts by weight of the aminoplast. When using a urea-formaldehyde syrup having a water content of 35% by weight, and a prepolymer blend of NCO content of 18%, the use of equal weights of these components leads to foams of density about 20 gms./l., whereas use of a higher ratio of the prepolymer provides foams of lower density, e.g., a weight ratio of 2 parts of the prepolymer to 1 part of the aminoplast syrup gives foams of density about 12 gms./l. On the other hand, by adding lime or other $CO_2$ absorbers to the aminoplast precondsensate, it is possible to increase the density of the resultant product and, if sufficient be used, to completely prevent foaming.

In addition, fillers, reinforcing agents and smoke suppressors, if desired, can be added by mixture with the reactants. As examples of these, there may be mentioned talc, clay, silica, milled or chopped glass fibre, wolastonite and aluminium hydrate. Lightweight fillers, e.g. fly ash or so-called "floaters" obtained from this ash, e.g. "Fillite," have the effect of giving additional fire resistance and are of value in reducing the density of the non-foam products of the invention. If such an addition increases the viscosity of the aminoplast mixture too much, it is possible to add a small quantity of water to counteract this.

In the variations of the process wherein the polyol, or a part thereof, is added to the aminoplast precondensate solution, it is advantageous in many cases to add a supplementary catalyst for the polyurethane-forming reaction i.e. a catalyst of the metal salt or organo-metallic series, e.g. lead, mercury or tin salts of organic acids or organo-metallic compounds containing these metals. As particular examples of these, there may be mentioned lead octoate, stannous octoate, dibutyltindilaurate, dibutyltindiacetate and dibutyltinmercaptide.

All the products of the invention have very good resistance to heat and to flames. For example, even when subjected to the action of a butane blowlamp, the products of the invention only char with negligible travel of the degradation, and without brusting into flames themselves. The charred material resists the passage of heat and may contribute to the flame resistance by itself becoming red hot and reflecting back heat. Fumes given off in such a treatment are white in colour and display less obscuration of vision than the fumes emitted from conventional polyurethane foams under similar treatment.

The invention is illustrated by the following Examples in which parts and percentages are by weight:

EXAMPLE 1

A mixture of:

|  | parts |
|---|---|
| Borden's Casco Resin UL53 (a urea-formaldehyde resin of 65% solids content) | 87 |
| Dow's Voranol RA800 (an oxypropylated ethylene diamine of OH value 800) | 10 |
| B.P.'s Silicone SR160 | 2 |
| dimethylaminocyclohexane | 1 |
|  | 100 | and a mixture of:

| ICI's Suprasec VM 90 (a crude MDI) | 100 |
|---|---|
| tris-(2-chloroethyl)phosphate | 50 |
|  | 150 | were mixed together at ambient temperature of 20° C. An emulsion formed and started to rise after 15 seconds and ended at 1 minute to give a fine textured foam having a density of 23 g./l. This foam had good resistance to flames and to burning, forming a char and producing white smoke only.

EXAMPLE 2

A mixture of:

|  | parts |
|---|---|
| Borden's Casco Resin UL53 | 90 |
| triethanolamine | 7 |
| Silicone SR160 | 2 |
| dibutyltin dilaurate | 1 |

-continued

| | parts |
|---|---|
| | 100 | was mixed with 150 parts of the isocyanate mixture described in Example 1. An emulsion formed which started to rise at 25 seconds and finished rising after 2 minutes. A rigid foam was obtained having a density of 22 g./l. and similar flame-resistant properties as the product of Example 1.

EXAMPLE 3

A mixture of:

| | parts |
|---|---|
| Borden's Casco Resin ULF2 (a dicyandiamide-modified urea-formaldehyde resin) | 87 |
| ICI's Daltolac P150 (oxypropylated toluylene diamine of OH value 380) | 10 |
| Silicone LS360 | 2 |
| stannous octoate | 1 |
| | 100 | was stirred into an isocyanate component made from:

| | |
|---|---|
| Suprasec DND (a crude MDI of NCO content 31%) | 100 |
| Phosgard 2XC-20 | 35 |
| | 135 |

The resulting emulsion started to rise at 15 seconds and the foaming was complete in 2 minutes, giving a rigid foam of density 25 g./l., having good fire resistance.

EXAMPLE 4

| | parts |
|---|---|
| Component A | |
| was prepared by mixing: | |
| UL53 Resin | 90 |
| Quadrol | 5 |
| dimorpholinodiethyl ether | 2.5 |
| Silicone L5340 | 2 |
| dibutyltin dilaurate | 0.5 |
| Component B | |
| Suprasec DND | 100 |
| Arcton 11 | 20 |
| tri-(2-chloroethyl)phosphate | 30 |

Equal volumes of the two components were mixed at ambient temperature. The resulting emulsion started to rise at 20 seconds and foaming was complete at 2 minutes. The resulting foam had a density of 20.7 g./l., was fine-textured and shrink-free, and had excellent resistance to burning.

EXAMPLE 5

| | parts |
|---|---|
| Component A | |
| Casco Resin ULF2 | 80 |
| ICI's Daltocast 4 (a polyester containing primary OH groups-OH value 530) | 16 |
| Silicone 190 | 2 |
| dimethylcyclohexane | 2 |
| Component B | |
| Suprasec DND | 70 |

-continued

| | parts |
|---|---|
| tris-(2-chloroethyl)phosphate | 30 |

Equal weights of the two components were mixed at ambient temperatures. The resulting emulsion started to rise at 10 seconds and foaming was complete at 1 minute. The resulting foam had a density of 28.4 g./l. and good fire-resistance.

EXAMPLE 6

| | parts |
|---|---|
| Component A | |
| Casco Resin UL53 | 92.5 |
| Voranol RA800 | 5 |
| Silicone B1400 A (Goldschmitz) | 1.5 |
| stannous octoate | 1 |
| Component B | |
| Suprasec DND | 100 |
| tris-(2-chloroethyl)phosphate | 35 |
| Daltolac P130 (ICI) | 5 |

Component B was heated at 80° C. for 2 hours to form the prepolymer and the two components were mixed at ambient temperature. The resultant emulsion started to rise at 15 seconds and foaming was complete at 1 minute 50 seconds, giving a foam of density 19 g./l. which had excellent resistance to flames.

EXAMPLE 7

| | parts |
|---|---|
| Component A | |
| Suprasec DND | 100 |
| Voranol RA800 | 5 |
| tris-(2-chloroethyl)phosphate | 35 |

The mixture was allowed to stand at ambient temperature to form a prepolymer.

| | |
|---|---|
| Component B | |
| Casco Resin UL53 | 97.5 |
| Silicone B1400 A | 1.5 |
| dibutyltin dilaurate | 1 |

The two components were mixed at ambient temperature. The resulting emulsion started to rise at 25 seconds and foaming was complete at 2 minutes. The foam obtained had a density of 22 g./l. and had good resistance to flames.

EXAMPLE 8

| | parts |
|---|---|
| Component A | |
| Suprasec DND | 100 |
| tris-(2-chloroethyl)phosphate | 25 |
| Cereclor 50LV (chlorinated paraffin wax) | 10 |
| Daltolac P130 | 5 | were mixed and heated at 80° C. for 2 hours then allowed to cool.

| | |
|---|---|
| Component B | |

|  |  |
|---|---|
| Casco Resin UL53 | 100 |
| dimorpholinodiethyl ether | 5 |
| Silicone L5340 | 2 | were mixed together at room temperature.

Equal parts of components A and B were mixed together at 20° C. The mixture started to foam at 25 seconds and finished rising after 1 minute 50 seconds. The resultant foam was open-ceiled and free from shrinkage and had a very fine texture. It had a density of 20 g./l. and had very good resistance to flames. (Daltolac P130 is an oxypropylated sorbitol of OH value 460)

EXAMPLE 9

2 parts of component A and 1 part of component B of Example 8 were mixed together at 20° C. The mixture started to rise at 20 seconds and finished rising after 2 minutes. The resultant foam had a density of 12 g./l. It had a similar appearance and similar properties to the product of Eample 1.

EXAMPLE 10

This was carried out as described in Example 8, using equal parts of component A and the following:

|  | parts |
|---|---|
| Component B |  |
| Casco Resin UL 53 | 100 |
| dimorpholinodiethyl ether | 5 |
| Silicone L5340 | 2 |
| aluminium hydrate | 20 |
| water | 10 |

The resultant foam had a density of 25 g./l. and was generally similar to the product of Example 8, but gave off less smoke on heating.

EXAMPLE 11

|  | parts |
|---|---|
| Component A |  |
| Crude MDI | 100 |
| oxyprpylated sorbitol OH value 480 | 5 |
| tris-(2-chloroethyl)phosphate | 60 | were heated together at 80° C. for 2 hours.

|  |  |
|---|---|
| Component B |  |
| Casco Resin UL53 | 75 |
| calcium hydroxide | 15 |
| water | 10 |
| dimethylhexadecylamine | 1 |

Equal parts of the two components were mixed together at 20° C. A light brown emulsion was obtained which gelled in 20 minutes and hardened in 1 hour, without foaming. The product was a tough flame-resistant solid which sank in water.

EXAMPLE 12

This was carried out as described in Example 11, but using in place of component B, a mixture of the same ingredients plus 25 parts of "Fillite." The product had a lower density and floated on water, whilst also having good resistance to fire and impact.

EXAMPLE 13

This was carried out as described in Example 8, but using the following mixtures:

|  |  |
|---|---|
| Component A |  |
| Crude MDI | 100 |
| Oxyproylated sorbitol OH value 480 | 5 |
| Tris-(2-chloroethyl)phosphate | 35 |
| Component B |  |
| Casco Resin UL110 (urea/formaldehyde syrup of 68% solids) | 95 |
| Dimethylaminocyclohexane | 3 |
| Silicone L5340 | 2 |

When mixed at an ambient temperature of 22° C., foam rise started at 8 seconds and ended at 35 seconds. The product was a foam of good texture and stability having a density of 14.0 grams/liter.

EXAMPLE 14

This was carried out as described in Example 13 but adding 15 parts of Arcton 11 to Component A. The product was a foam of good texture and stability having a density of 13.9 grams/liter.

EXAMPLE 15

This was carried out as described in Example 13, but adding 30 parts of Arcton 11 to Component A. The product was a foam of good texture and stability having a density of 14.5 grams/liter.

EXAMPLE 16

This was carried out as described in Example 13, but using the following as Component B:

|  |  |
|---|---|
| Casco Resin UL53 | 86 |
| Silicone L5340 | 2 |
| Dimorpholinodiethyl ether | 2 |
| Oxypropylated ethylenediamine OH value 790 | 5 |

Foam rise started at 13 seconds and ended at 45 seconds giving a foam of good texture and having a density of 22 grams/liter.

EXAMPLE 17

This was carried as described in Example 13, but using the following Component B:

|  |  |
|---|---|
| Casco Resin UL53 | 81 |
| Silicone L5340 | 2 |
| Dimorpholinodiethyl ether | 2 |
| Oxypropylated ethylenediamine OH value 790 | 15 |

The foam started to rise at 15 seconds and ended at 50 seconds. The product was a foam of good texture and having a density of 27 grams/liter.

EXAMPLE 18

|  |  |
|---|---|
| Component A |  |
| Casco Resin UL53 | 96 |
| dimethylaminocyclohexane | 2 |
| Polyurac Silicone SR160 | 2 |
| Component B |  |
| Suprasec DND | 100 |

| Voranol RA 800 (Dow) | 4 |
| Phosgard 2XC-20 (Monsanto) | 36 |

(Component B was allowed to react at ambient temperature for 24 hours).

40 parts of Component A and 60 parts of Component B were mixed together. The emulsion formed started to rise after 12 seconds and finished the rise after 50 seconds, producing a fine-textured foam of density 13.5 g./l. which was open-celled and free from shrinkage. It had similar fire-resistance properties to the product of Example 1.

EXAMPLE 19

This was carried out as for Example 18, but using the following as Component B:

| Desdomur 44V10 (Bayer) | 100 |
| Daltolac P150 (ICI) | 6 |
| Reophos 50 (Albright & Wilson) | 14 |
| Daltogard F | 20 | again made by mixing and allowing to stand for 24 hours. (Daltolac P150 is an oxypropylated tolylenediamine of OH value 395; Reophos 50 is a synthetic triisopropyl phosphate; and Daltogard F is tris-(2-chloroisopropyl)phosphate).

The two components were mixed together for 10 seconds at 20° C. and the resulting thick but fluid emulsion started to rise in 10 seconds, completing its rise in 45 seconds and producing a fine-textured, open-celled foam of density 29 g./l. It had similar fire-resistance properties to the product of Example 8.

EXAMPLE 20

This was carried out as for Example 8, but using as Component B:

| Suprasec DNR | 100 |
| Daltolac P150 | 10 |
| tri(chloroethyl)phosphate | 90 |

The resulting fluid emulsion started to rise at 10 seconds and foaming was complete in 60 seconds. The foam was of fine texture and had a density of 15.2 g./l. It had similar fire-resistance properties to the product of Example 8.

EXAMPLE 21

This was carried out in a similar manner to Example 19, but using a ratio of 25 parts of Component A to 75 parts of Component B.

| Start of rise: | 10 seconds |
| foaming complete: | 1 minute |
| foam density: | 24 g./l. |

The product had similar fire-resistance properties to the product of Example 8.

EXAMPLE 22

This was carried out as for Example 21, but using a ratio of 50 parts of Component A to 50 parts of Component B.

| Start of rise: | 10 seconds |
| foaming complete: | 1 minute |
| foam density: | 23 g./l. |

The product had similar fire-resistance properties the product of Example 8.

EXAMPLE 23

This was carried out as described in Example 8, but using the following mixtures:

| Component A | |
| --- | --- |
| by reacting together: | |
| Suprasec DND | 100 parts |
| Varanol RA 800 | 5 parts |
| tri-(2-chloroethyl)phosphate | 65 parts |
| Arcton 11 | 20 parts |
| Component B | |
| Casco Resin ULF2 (a dicyandiamide-modified urea-formaldehyde precondensate) | 96 parts |
| dimethylaminocyclohexane | 2 parts |
| Polyurax Silicone SR 234 | 2 parts |

The two components were mixed in the ratio of 60 parts of A to 40 parts of B; this gave a low viscosity system which was easy to mix and provided above-average flow properties before starting to rise at 10 seconds and ending the rise at 1¼ minutes. The resulting foam had a density of 19.4 g./l., was free from shrinkage and had excellent fire resistance.

EXAMPLE 24

This was carried as described in Example 8, but using the following mixtures:

| Component A | |
| --- | --- |
| by reacting together: | |
| Propacon M (Lankro) | 100 parts |
| Atpol G790 (Atlas)- oxypropylated ethylenediamine OH value 790 | 5 parts |
| tris-(2,3-dichloropropyl)phosphate | 45 parts |
| Component B | |
| Casco Resin ULF2 | 97 parts |
| dimethylaminocyclohexane | 1 part |
| Polyurax Silicone SR 234 | 2 parts |

Mixture at ambient temperature of 20° C. using a ratio of 60 parts of A to 40 parts of B gave a reaction starting at 20 seconds and ending its rise at 4¼ minutes to give a foam of density 29 g./l. and having excellent fire resistance.

What I claim is:

1. A process for the manufacture of flame-resistant polymer materials which comprises reacting together a stoichiometric excess of an organic polyisocyanate comprising di(isocyanatophenyl)methane or a mixture of di(isocyanatophenyl)methane with poly(isocyanatophenyl) polymethylenes, and an isocyanate-reactive polyether containing 4 to 6 hydroxyl groups to form a prepolymer and subsequently reacting the prepolymer with an aqueous solution of a urea-formaldehyde precondensate in the presence of a poly(-haloalkyl) phosphate of a catalyst selected from the class consisting of di-N-morpholinodialkyl ethers, bis(-dialkylamino)dialkyl ethers and tetraalkylalkylenediamines.

2. A process as claimed in claim 1 wherein the poly(haloalkyl)-phosphate is added to the polyisocyanate prior to reaction of the polyisocyanate with any of the other materials.

3. A process as claimed in claim 2, wherein the poly(haloalkyl)phosphate used is tris-(2-chloroethyl) phosphate.

4. A process as claimed in claim 3, wherein as catalyst there is used di-N-morpholinodietyl ether.

5. A process as claimed in claim 3, wherein as catalyst there is used bis(dimethylamino)diethyl ether.

6. A process as claimed in claim 3, wherein as catalyst there is used tetramethylethylene diamine.

* * * * *

UNITED STATES PATENT AND TRADEMARK OFFICE
CERTIFICATE OF CORRECTION

PATENT NO. : 4,435,526
DATED : March 6, 1984
INVENTOR(S) : Alan M. WOOLER

It is certified that error appears in the above-identified patent and that said Letters Patent is hereby corrected as shown below:

Column 2, line 11, correct spelling of "haloalkyl"

Column 4, line 23, correct spelling of "bursting"

Column 10, line 65, after "phosphate" insert --and--

Column 12, line 2, correct spelling of "morpholinodiethyl"

Signed and Sealed this

Tenth Day of September 1985

[SEAL]

Attest:

DONALD J. QUIGG

Attesting Officer   Acting Commissioner of Patents and Trademarks - Designate